United States Patent [19]

Brenig

[11] 4,426,733

[45] Jan. 17, 1984

[54] VOICE-CONTROLLED OPERATOR-INTERACTING RADIO TRANSCEIVER

[75] Inventor: Theodore Brenig, Lynchburg, Va.

[73] Assignee: General Electric Company, Lynchburg, Va.

[21] Appl. No.: 343,754

[22] Filed: Jan. 28, 1982

[51] Int. Cl.³ .............................................. H04B 1/46
[52] U.S. Cl. ...................................... 455/79; 455/151; 455/221; 381/43; 367/198
[58] Field of Search .................... 455/78, 79, 151, 355; 179/1 VC, 1 SB, 1 SD, 1 VC; 364/513

[56] References Cited

U.S. PATENT DOCUMENTS

| | | | |
|---|---|---|---|
| 3,742,143 | 6/1973 | Awipi | 179/1 VC |
| 4,087,636 | 5/1978 | Akiyama et al. | 455/79 |
| 4,103,105 | 7/1978 | Akiyama et al. | |
| 4,197,498 | 4/1980 | Fukui et al. | 455/78 |
| 4,348,550 | 9/1982 | Pirz et al. | 179/1 VC |

FOREIGN PATENT DOCUMENTS 2435 9/1978 European Pat. Off. .

OTHER PUBLICATIONS

"A Portable Voice Controlled System for the Disabled" by Cohen et al., 10/77.

*Primary Examiner*—Jin F. Ng
*Attorney, Agent, or Firm*—Cushman, Darby & Cushman

[57] ABSTRACT

A voice-controlled, operator-interacting radio transceiver has a transceiver for transmitting and receiving radio frequency signals under plural potential operating conditions including on/off, transmit/receive, frequency of operation, squelch, volume control, etc. A speech recognition circuit receives audible verbal phrases spoken by a human operator and produces control signals in response to certain predetermined recognized phrases. The operation of the transceiver is controlled in response to the control signals and further coded data signals representative of the respective predetermined operating condition of the transceiver are also produced. Output devices are responsive to the further coded data signal for producing an output signal perceptible to the human operator and confirmatory of the control action then being effected.

21 Claims, 5 Drawing Figures

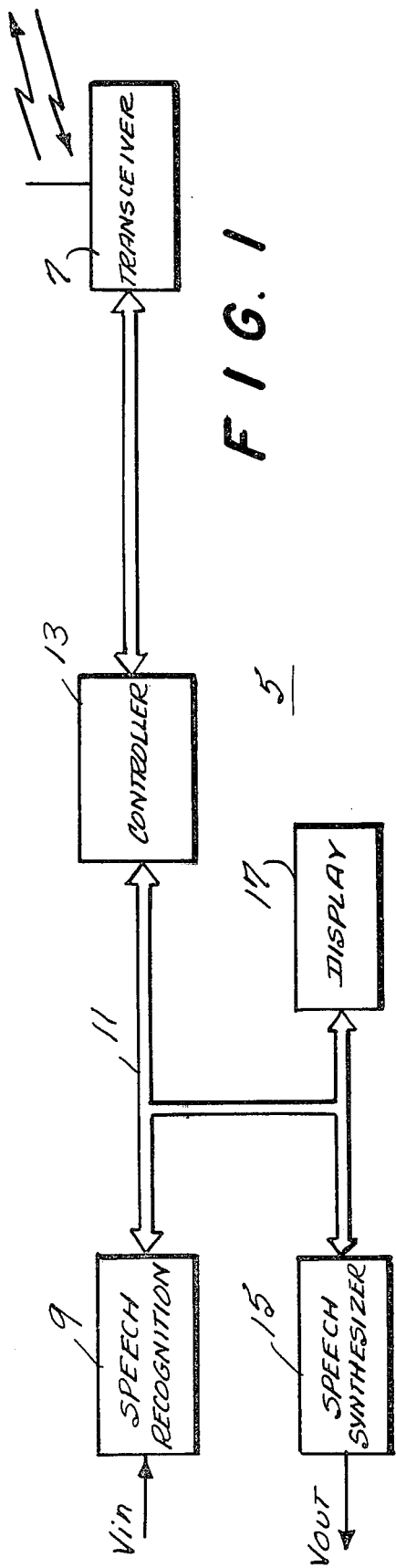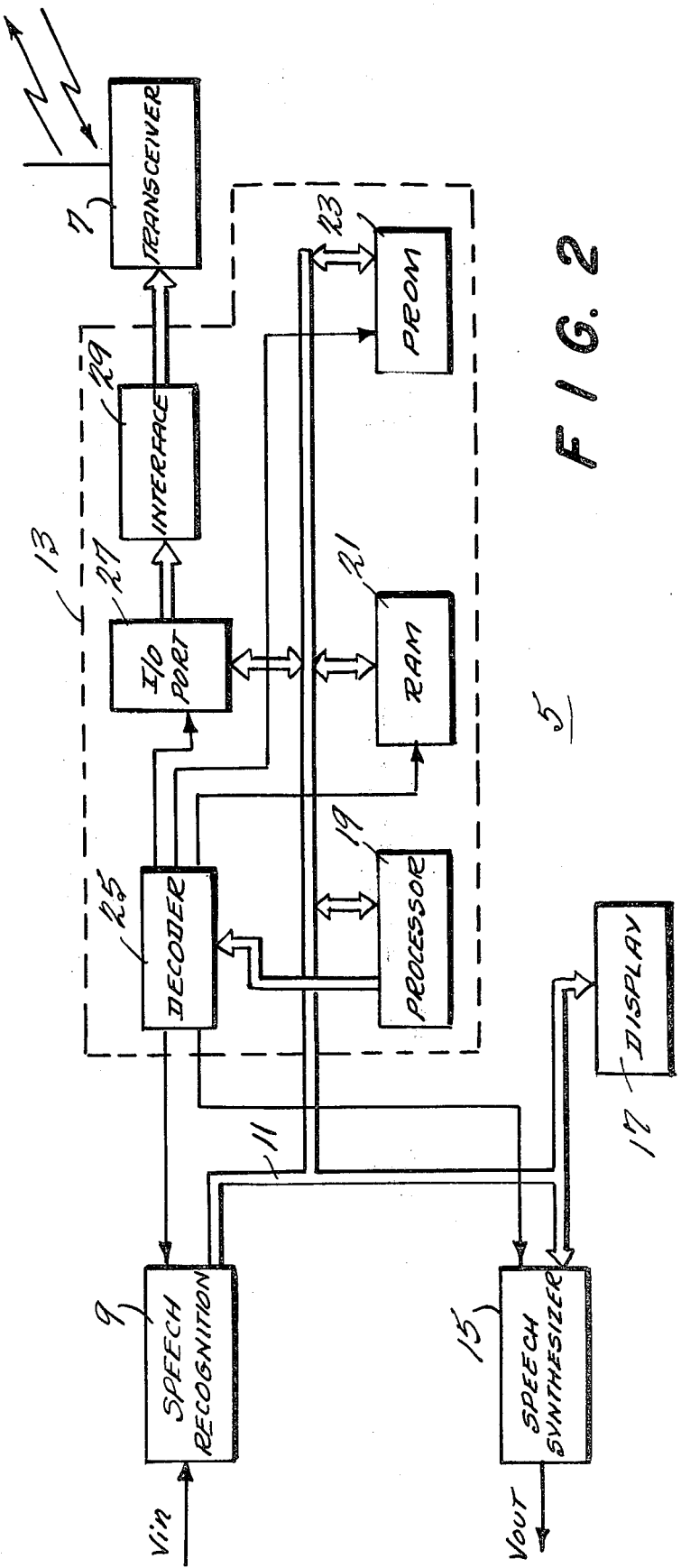

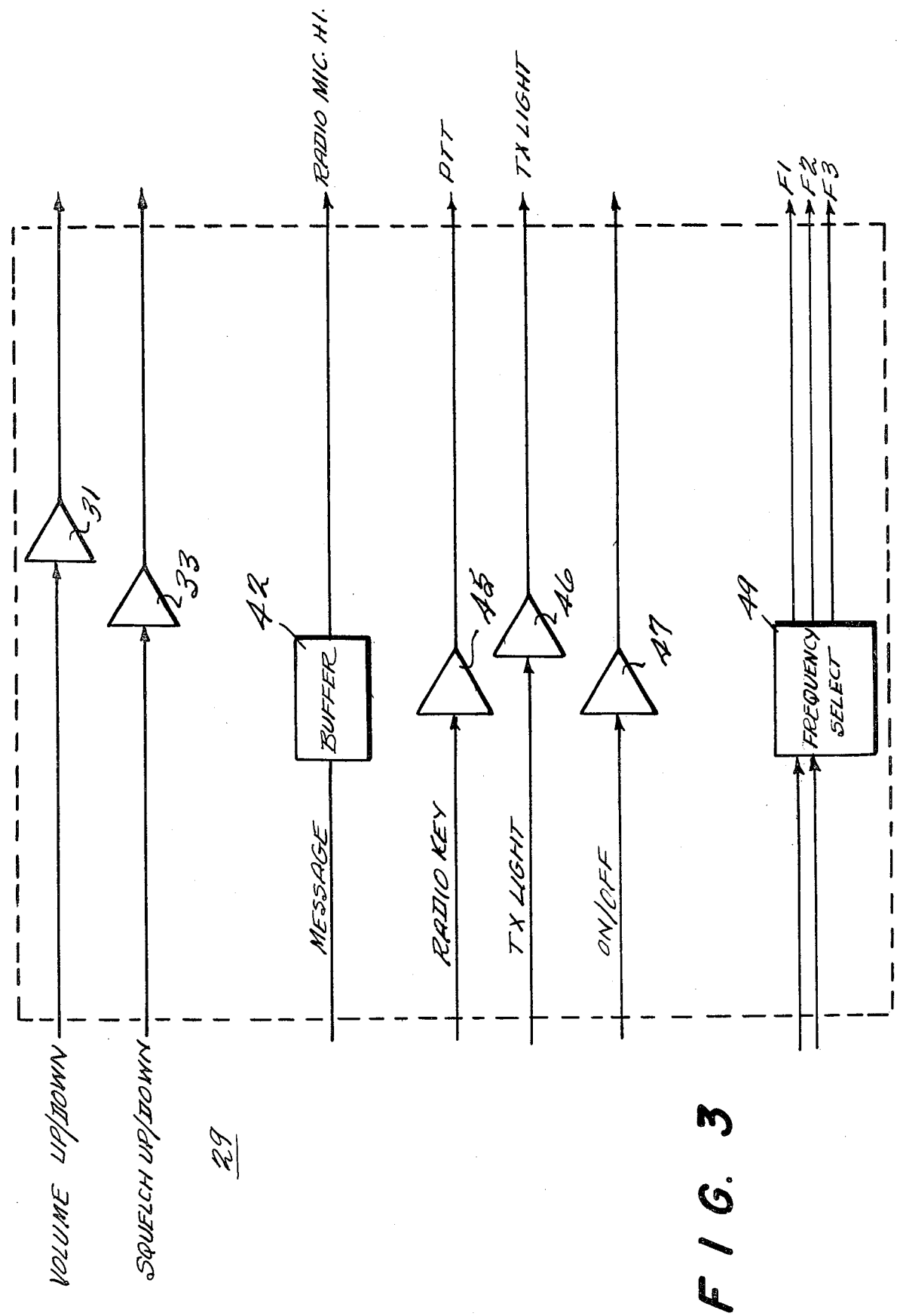

VOICE-CONTROLLED OPERATOR-INTERACTING RADIO TRANSCEIVER

BACKGROUND OF THE INVENTION

The present invention is related generally to radio transceivers and more particularly to such transceivers that are voice-controlled.

Radio transceivers capable of receiving and transmitting radio messages are well known in the prior art. The typical prior art radio transceiver requires several manual operations in order to properly control the operating conditions of the transceiver. Such manual operations include turning the transceiver on and off, switching the transceiver from a transmit to a receive mode, changing the operating frequency of the transceiver, etc. For a large part of the public these manual operations pose no problem. However, for a significant portion of the population such as police or other emergency personnel or the handicapped, performance of these manual operations may be inconvenient or even impossible. For this reason, there is a need to provide a voice-controlled radio transceiver capable of performing all of the necessary manual operations in response to voice commands. The present invention is for a radio transceiver capable of satisfying this need.

Radio transceivers partially responsive to voice commands are known in the prior art. One manual operation which has already been replaced by a voice-controlled operation is the switching of the transceiver between the transmit and the receive modes. See for example U.S. Pat. Nos. 3,169,221 to A. J. Franchi; 4,103,105 to Akiyama et al; 4,166,978 to White; and 4,178,548 to Thompson.

A voice-responsive mobile status unit is disclosed in commonly assigned U.S. Application Ser. No. 337,762 filed Jan. 7, 1982. The mobile status unit disclosed therein is responsive to predetermined spoken phrases which are identified and represented as a digital code before being transmitted to a base station transceiver or the like so as to more quickly and accurately transmit status information to a central station.

Voice-control of machines other than radio transceivers is also known. In U.S. Pat. No. 4,275,266 to Lasar, a device for controlling machines by voice is disclosed which responds to a plurality of predetermined musical tones in a sequence to generate a digital control output signal. In an article entitled "Experimental Telephone Lets Disabled Dial By Voice," Bell Lab (USA) Vol. 51, No. 9, an experimental telephone for physically handicapped people unable to hold a telephone handset or dial a conventional phone is described. The telephone will respond to any sound, even whistling, blowing, or tapping, above a certain threshold. The user must then turn on the phone's circuitry by entering an access code before entering the phone number.

In an article entitled "Voice Data Entry Computer Terminal Allows User to Select 900-Word Vocabulary" found in Digital Technology Review (USA) Vol. 17, No. 6, an intelligent voice terminal enables operators to enter data directly into a computer using familiar English language by speaking into a microphone or telephone handset. The system may be expanded to provide audio response through a voice synthesizer unit. The heart of the intelligent voice terminal is an acoustic pattern classifier that produces a digital code in response to a received utterance. An action structure associating an appropriate system action with each command that is recognized is also available. Actions may range from simply outputting a code associated with a recognized word to executing a complex computer program that is a function of several previously input commands. Another article discussing the voice-input of data is found in EDN, May 27, 1981, pages 101-113 by Edward R. Teja.

SUMMARY OF THE PRESENT INVENTION

The present invention is for a voice-controlled operator-interacting radio transceiver. The radio transceiver is comprised of means for transmitting and receiving radio frequency signals which has a plurality of potential operating conditions including on/off, transmit/receive, frequency of operation, squelch, volume, etc. A microphone or other transducer is provided for receiving audible verbal phrases spoken by a human operator. A speech recognition circuit recognizes each of predetermined spoken phrases which define a predetermined desired one of the operating conditions. A control signal responsive to the recognized predetermined spoken phrase is produced by the speech recognition circuit. Control means are provided for controlling the operation of the radio transceiver with respect to the operating condition in response to the control signals. The control means further produces a coded data signal representative of the respective operating condition of the transceiver which results from the control signal. In one embodiment, output means responsive to the coded data signal produce an output signal perceptible to the human operator which confirms the control action then being effected. The output means may take a variety of forms including indicator lights or a speech synthesis circuit.

BRIEF DESCRIPTION OF THE DRAWINGS

FIG. 1 is a block diagram illustrating a voice-controlled, operator-interacting radio transceiver constructed according to the teachings of the present invention;

FIG. 2 is a block diagram illustrating the voice-controlled, operator-interacting radio transceiver of FIG. 1 in greater detail;

FIG. 3 is a block diagram illustrating the details of the interface circuit shown in FIG. 2;

DESCRIPTION OF THE PREFERRED EMBODIMENT

Figure 4:
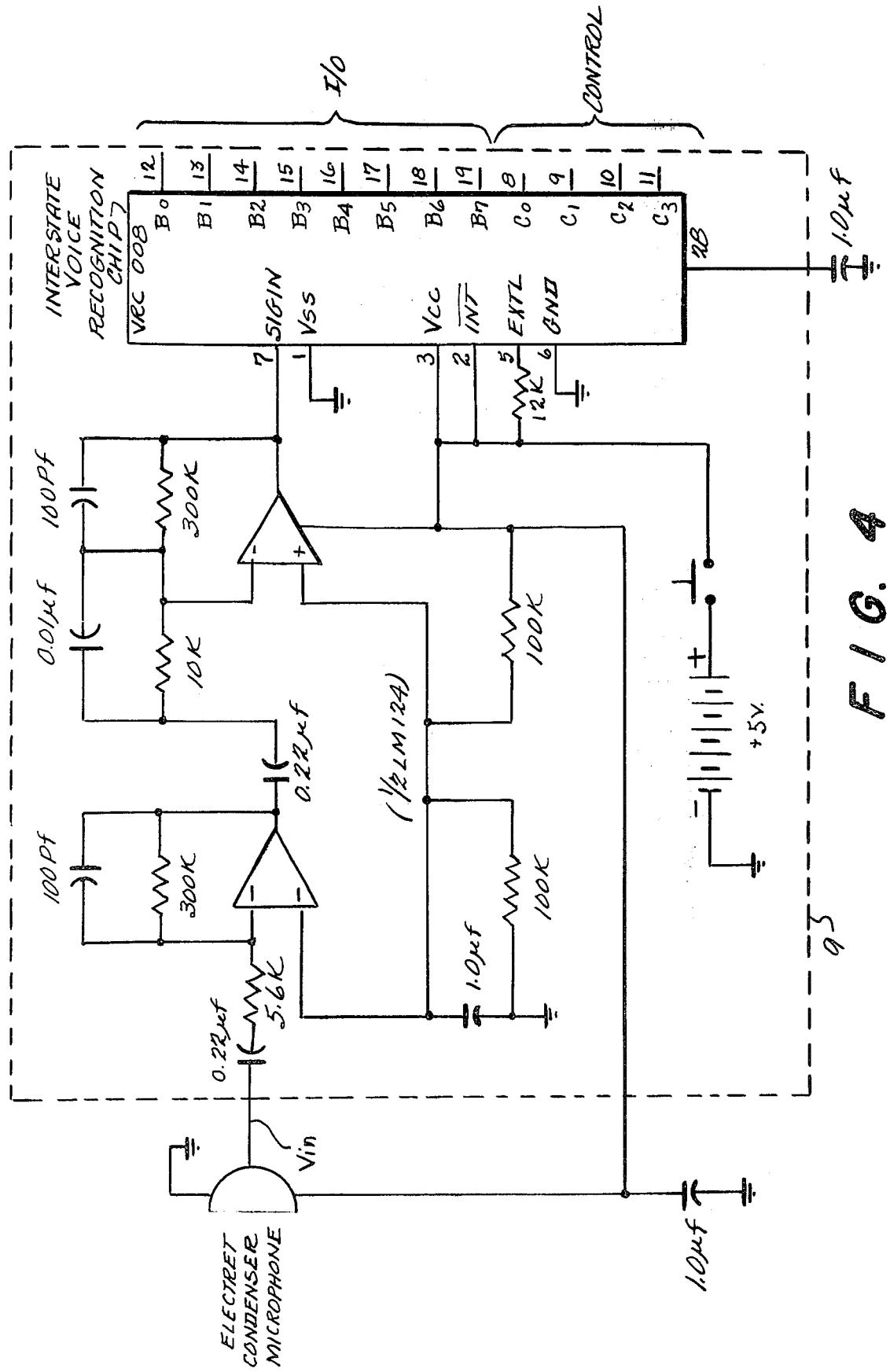
FIG. 4 is an electrical schematic illustrating the details of the speech recognition circuit shown in FIGS. 1 and 2.

A voice-controlled, operator-interacting radio transceiver 5 constructed according to the teachings of the present invention is illustrated in block diagram form in FIG. 1. The voice-controlled, operator-interacting radio transceiver 5 has a conventional circuit 7 for transmitting and receiving radio frequency signals. The circuit 7 is a well known conventional type of radio transceiver circuit having a plurality of potential operating conditions. These conditions include on/off, transmit/receive, frequency of operation, squelch up/- squelch down, volume up/volume down, etc. Control of these operating conditions is required for proper operation of the radio transceiver circuit 7.

Control of the radio transceiver circuit 7 is accomplished through proper use of verbal phrases spoken by a human operator. These spoken verbal phrases are converted into electrical input signals $V_{in}$ by a transducer such as a conventional microphone or the like, not shown. The electrical input signals $V_{in}$ are input to a speech recognition circuit 9 which is responsive to certain predetermined spoken phrases, each defining a predetermined desired change in one or more of the operating conditions. The speech recognition circuit 9 produces a predetermined control signal in response to each of the recognized, predetermined spoken phrases.

The speech recognition circuit is connected to a controller 13 through a bus 11. The bus 11 typically includes a conventional data bus, control bus and address bus. The controller 13 controls the operation of the radio transceiver circuit 7 in response to the predetermined control signals. This eliminates the need for manual operations or the need for holding a microphone with a push-to-talk switch. When the controller 13 recognizes a control signal, it activates a circuit path within the radio transceiver circuit 7 for performing the desired function.

The controller 13, in addition to activating the circuit path for performing the desired function, produces a coded data signal representative of the predetermined operating condition of the radio transceiver 7. A speech synthesizer 15 and a display 17 are each connected to the controller 13 via the bus 11. As the controller 13 performs the desired control function, it may simultaneously direct a visual display by the display 17 by producing the proper coded data signal. Alternatively or in addition, the speech synthesizer 15 may produce electrical output signals $V_{out}$ responsive to the coded data signals produced by the controller 13. A transducer such as a conventional speaker, not shown, is responsive to such electrical output signals $V_{out}$ for producing speech phrases which are audible to the human operator and confirmatory of the control action that has been effected. In this manner, output signals either from the speech synthesizer 15 or the display 17, or both, are produced which are perceptible to the human operator and confirmatory of the control action then being effected. Thus, control of the operating conditions of the radio transceiver 7 and confirmation of the performance of the proper control function may be executed entirely in audible form thereby obviating the need for manual control operations.

The voice-controlled, operator-interacting radio transceiver 5 illustrated in FIG. 1 may be extremely useful to handicapped persons lacking the maneuverability necessary for operating a conventional radio transceiver. The voice-controlled, operator-interacting radio transceiver 5 is also useful to police, firemen, and other emergency personnel whose attention may be directed elsewhere, such as for driving a vehicle, and thereby lack the necessary mobility for operating a conventional radio. Additionally, the radio transceiver 5 illustrated in FIG. 1 may be programmed so as to perform predetermined programs such as a performance check on the system in response to a predetermined verbal command. The results of the performance check may be displayed by the display 17 or given audibly to the operator by the speech synthesizer 15. Such a feature provides maximum flexibility and insures proper operation of the radio transceiver 5.

In FIG. 2 a more detailed block diagram of the voice-controlled, operator-interacting radio transceiver of FIG. 1 is illustrated. In FIG. 2 the components comprising the controller 13 are illustrated. The controller 13 is comprised of a conventional data processor 19 operating under the control of program instructions stored in a programmable read only memory (PROM) 23. Additional temporary memory is provided by a random access memory (RAM) 21. The processor 19, read only memory 23, and random access memory 21 are interconnected by the bus 11.

A conventional address decoder 25 under control of the processor 19, addresses individual components of the radio transceiver 5 in order to control their output of information to, and input of information from, the bus 11. An input/output port 27 and an interface unit 29 are provided in order to facilitate communications between the processor 19 and the radio transmitter/receiver circuit 7.

The interface unit 29 is illustrated in detail in FIG. 3. The functions provided by the interface until 29 will depend upon the programming of the processor 19 and the functions for which the processor 19 produces control signals. A list of control functions in one embodiment includes:
unit on/off
volume up/down
start/stop
receive/transmit frequency
squelch up/down
alarm on/off
power high/low
automatic acknowledge on/off
transmit predetermined tone
initiate program, performance test, send emergency messages, etc.
call home, office, etc.

The implementation of certain of these functions is illustrated in FIG. 3.

In FIG. 3, a volume up/down control signal produced by the processor 19 is input to the transceiver circuit 7 through an amplifier 31. A squelch up/down control signal is input to the transceiver circuit 7 through an amplifier 33. For transmission of an outgoing signal, the message is input to the transceiver circuit 7 through a buffer 42. Additionally, a push-to-talk button and a transmission light on the transceiver circuit 7 are activated by a radio key signal and a transmission light signal produced by the processor 19 and input to the transceiver circuit through amplifiers 45 and 46, respectively.

Additional functions which may be performed by the interface unit 29 include turning the transceiver circuit 7 on and off by inputting an on/off control signal to the transceiver circuit 7 through an amplifier 47 and changing the frequency of the transceiver circuit 7 through a frequency select circuit 49. In summary, the interface unit 29 couples control signals produced by the processor 19 and outgoing messages to the appropriate circuitry of the transceiver circuit 7.

Referring now to FIG. 4, the speech recognition circuit 9 of FIGS. 1 and 2 may be a voice recognition chip with associated components such as a model VRC008, a voice recognition chip set such as a model VRC100-1 or a voice recognition module such as a model VRQ400, all of which are available from Interstate Electronics Corporation, Voice Products Operations, P.O. Box 3117, Anaheim, Calif. FIG. 4 illustrates one embodiment of the speech recognition circuit 9 comprised of the aforementioned model VRC008 and associated components.

In order to simplify the speech recognition circuit 9 and to make it more secure, the verbal phrases spoken by the human operator can be coded similar to the 10—. . . code. For example, A1 may represent turning the radio transceiver on, A2 may represent setting the frequency to Rf1, etc. However, the code need not be alphanumeric. For example, "Adam 2" may be easier to recognize than "A2" depending upon the chosen hardware. In any event, coding the verbal phrases should simplify the speech recognition process as well as provide an important advantage in noisy environments such as a moving vehicle.

The speech synthesizer 15 may be a voice response module, model number VTM150, available from the aforementioned Interstate Electronics Corporation, a TMS5100 four bit synthesizer, a TMS5200 eight bit synthesizer, or other commercially available speech-synthesizer chips.

Figure 5:
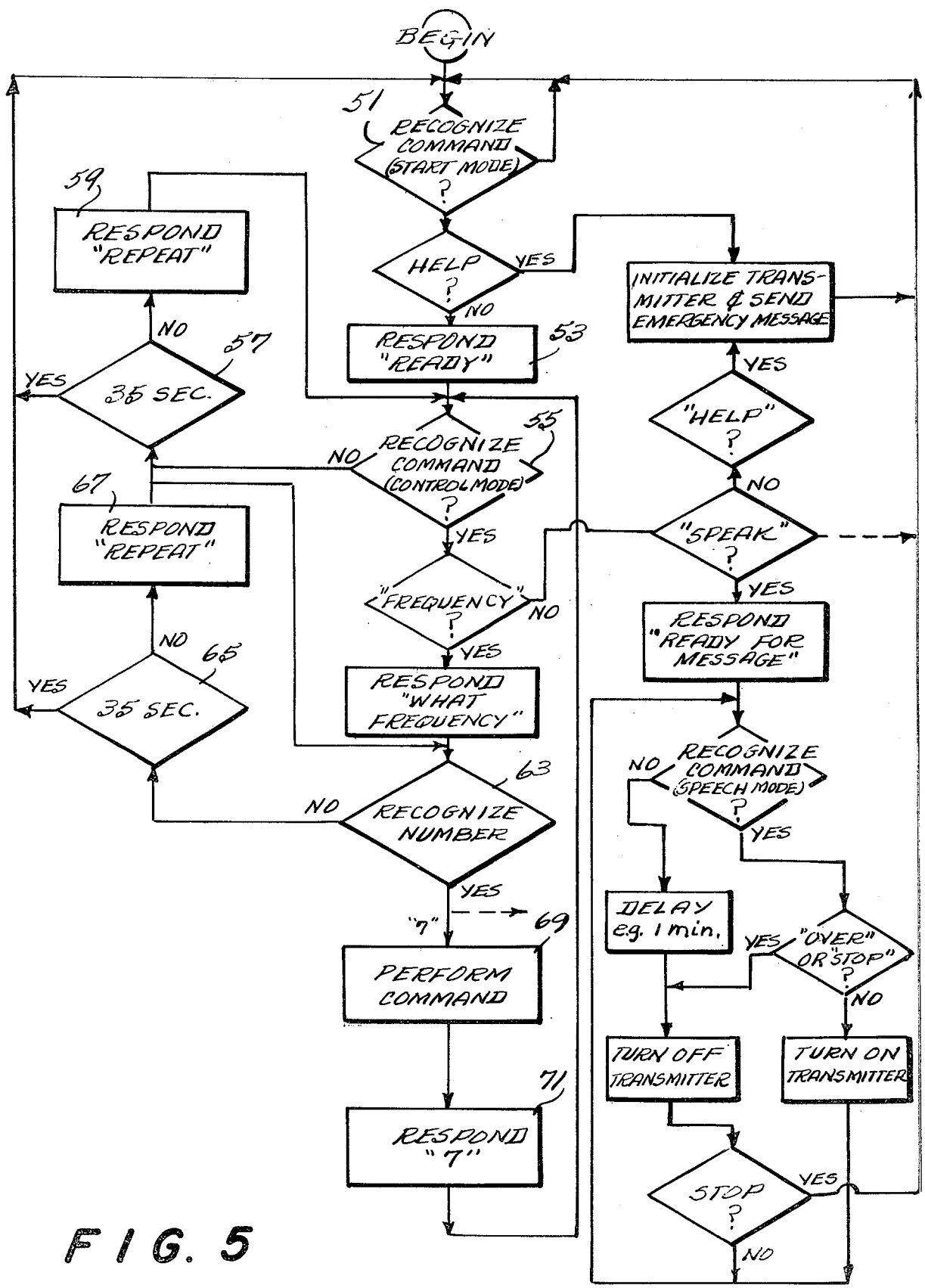
FIG. 5 is a flow chart illustrating a program control sequence for the programmed data processing portion of the voice-controlled, operator-interacting radio transceiver of FIG. 1.

FIG. 5 is a flow chart illustrating a program sequence of control for the program stored in PROM 23. The sequence of operation begins at decision step 51 wherein the processor 19 determines if an initialization command such as "start" has been recognized. [Note that all command words shown in the Figure are given as an example only. Other words can be substituted to enhance security or for other operational reasons (e.g., the initialization command word "start" could be replaced by "ninety-nine," etc.)] The processor 19 remains at decision step 51 until the speech recognition circuit 9 indicates that an initialization command has been received.

After recognition of an initialization command, the processor 19 directs the speech synthesizer 15 to respond "ready" as indicated by step 53. The processor 19 proceeds to decision step 55 to determine if a recognized command has been received. If no recognizable command has been received the operator has 35 seconds in which to enunciate a recognizable command. During this time, the processor 19 directs the speech synthesizer 15 to respond "repeat" to inform the operator that no recognizable command has been received. if the operator does not enunciate a recognizable command within 35 seconds the processor 19 returns to the initial step 51. However, if a recognized command is spoken the processor 19 directs the speech synthesizer 15 to respond with an appropriate message keyed to the recognized command.

The flow chart in FIG. 5 illustrates the sequence of operation in response to the commands "frequency", "help" and "speak". The reader should recognize that a plurality of other branches would be followed by the processor 19 in response to the recognition of various other commands. In FIG. 5, in response to the command "frequency" the speech synthesizer 15 responds "what frequency" at step 61.

After the frequency synthesizer 15 has responded "what frequency," the processor 19 expects to recognize a number representative of a given frequency as indicated by decision step 63. The operator then has 35 seconds in which to enunciate the desired frequency. The processor 19 will direct the speech synthesizer 15 to respond "repeat" as indicated by block 67 until a number has been recognized or until 35 seconds elapses.

Assuming that the number "7" has been recognized, the processor 19 will activate the appropriate circuitry within the transceiver 7 through the input/output port 27 and the interface circuit 29 so as to effectuate the command. Simultaneously, the display 17 is directed to display the chosen frequency while the speech synthesizer 15 is directed to respond "7" verifying the channel/frequency chosen by the operator.

After the frequency has been appropriately set, the processor 19 returns to decision step 55 to await another recognizable command such as "volume" or "speak". If no such command is recognized the processor 19 returns to the initial step 51, as previously described. In response to recognition of the predetermined command word "speak," the processor 19 directs the speech synthesizer 15 to respond "ready for message." At the same time the system switches to the speech mode, during which time the work "stop" causes the processor to return to decision step 51. The word "on" turns on the transmitter, the word "over" turns off the transmitter and all other words are then ignored. This is to prevent any command from being executed if a command word is being used during the conversation which is being transmitted. If no command is recognized, the transmitter is turned off after an optional time delay, e.g., one minute.

As can be seen from the above described sequence of operations, the present invention provides a great deal of flexibility such that the radio transceiver 5 may be programmed so as to perform a wide variety of functions. The processor 19 can be programmed to cause the speech synthesizer 15 to respond "repeat" whenever the expected answer is not recognized. The command "list" can be provided to direct the synthesizer to list all permissible commands and to instruct a user in how to use the unit. The command "help" can be used to initialize the transmitter (e.g., maximum power, a special frequency, etc.) and to send an emergency message. If desired, the call for help can be disguised by using a different code word or phase. This command is used to alert a police department of an event requiring immediate help. (Presently, a hidden switch is used for this function.) Additionally, the processor 19 may be programmed so as to provide a predetermined period of time during which a recognizable answer must be received. It may also be desirable to program the radio transceiver 5 to repeat the commands after execution or simply to answer "check." Because of the virtually unlimited programming options, the above-described flow chart is intended for purposes of illustration only.

Briefly reviewing, a voice-controlled, operator-interacting radio transceiver is disclosed. The operating condition of a radio transmitter/receiver circuit is controlled by a controller responsive to recognized, predetermined verbal phrases spoken by a human operator. The controller additionally produces coded data signals representative of the respective predetermined operating conditions. The coded data signals are input to an appropriate output device for producing audio and/or video output signals perceptible to the human operator for confirming the control action then being effected. It is anticipated that modifications of the embodiment disclosed herein can be effected without departing from the scope and spirit of the present invention as embodied in the following claims.

What is claimed is:

1. A voice-controlled operator-interacting radio transceiver, comprising:

radio transceiver means for transmitting and receiving radio frequency signals and having plural potential operating conditions including at least transmit, receive, volume and squelch control;

speech recognition means for receiving audible verbal phrases spoken by a human operator, for recognizing each of predetermined plural spoken phrases which define predetermined desired respectively corresponding ones of said operating conditions, and for producing a respectively corresponding predetermined control signal in response to each of said predetermined spoken phrases;

control means for controlling the operation of said radio transceiver means with respect to said operating conditions in response to a production of a corresponding one of said predetermined control signals, said control means further producing a coded data signal representative of the respective predetermined operating condition of said transceiver means corresponding to the produced control signal; and output means responsive to said coded data signal for converting said coded data signal to a predetermined output signal perceptible to the human operator and confirmatory of the control action then being effected.

2. The voice-controlled operator-interacting radio transceiver of claim 1 wherein the output means includes speech synthesis means responsive to said coded data signal for converting said coded data signal to a predetermined speech phrase.

3. The voice-controlled operator-interacting radio transceiver of claim 2 wherein the control means produces a further coded data signal representative of the speech phrase "repeat" when the speech recognition means receives but does not recognize a verbal phrase.

4. The voice-controlled operator-interacting radio transceiver of claim 1 wherein the output means includes visual feedback means responsive to said coded data signal for converting said coded data signal to a predetermined visual output.

5. The voice-controlled operator-interacting radio transceiver of claim 1 wherein the plural potential operating conditions further include controlling the transceiver on and off.

6. The voice-controlled operator-interacting radio transceiver of claim 1 including means for producing electrical impulses representative of speech, said electrical impulses being input to the speech recognition means.

7. The voice-controlled operator-interacting radio transceiver of claim 1 wherein the control means performs predetermined programmed control sequences and produces further coded data signals representative of the performance of said predetermined programmed control sequences.

8. The voice-controlled operator-interacting radio transceiver of claim 7 wherein the predetermined programs include a performance check.

9. The voice-controlled operator-interacting radio transceiver of claim 7 wherein the predetermined programs include the transmission of a predetermined message.

10. A method of voice-controlling a radio transceiver, comprising:

transmitting and receiving radio frequency signals in accordance with plural potential operating conditions at a radio transceiver including at least transmit, receive, volume and squelch control;

receiving audible verbal phrases spoken by a human operator, recognizing each of predetermined plural spoken phrases which define predetermined desired respectively corresponding ones of said operating conditions, and producing a respectively corresponding predetermined control signal in response to each of said predetermined spoken phrases;

controlling the operation of said radio transceiver with respect to said operating conditions in response to a production of a corresponding one of said predetermined control signals, producing a coded data signal representative of the respective predetermined operating condition of said transceiver corresponding to the produced control signal; and converting said coded data signal to a predetermined output signal perceptible to the human operator and confirmatory of the control action then being effected.

11. The method of claim 10 including producing electrical impulses representative of speech, said electrical impulses being input to the speech recognition means.

12. The method of claim 10 wherein said controlling step includes response to plural successive command words before producing said control signal thereby enhancing the security of operation.

13. A method as in claim 10 wherein the converting step includes converting said coded data signal to a predetermined speech phrase.

14. The method of claim 13 wherein the controlling step produces a further coded data signal representative of the speech phrase "repeat" when the speech recognition means receives but does not recognize a verbal phrase.

15. The method of claim 10 wherein the converting step includes visual feedback to the operator responsive to said coded data signal.

16. The method of claim 10 wherein the plural potential operating conditions further include controlling the transceiver on and off.

17. The method of claim 10 wherein the controlling step performs predetermined programmed control sequences and produces further coded data signals representative of the performance of said predetermined programmed control sequences.

18. The method of claim 17 wherein the predetermined programs include a performance check.

19. The method of claim 17 wherein the predetermined programs include the transmission of a predetermined message.

20. The method of claim 10 wherein said controlling step includes response to predetermined coded pairs of command words before producing said control signals thereby enhancing operation in a mobile environment.

21. The method of claim 10 wherein said controlling step includes automatically generating an emergency "help" call in response to at least one predetermined command word.

* * * * *